Jan. 25, 1966    J. P. DANFORTH ETAL    3,231,739
VARIABLE SPECIFIC GRAVITY RADIOACTIVE SOURCE HOLDER
Filed Oct. 12, 1960
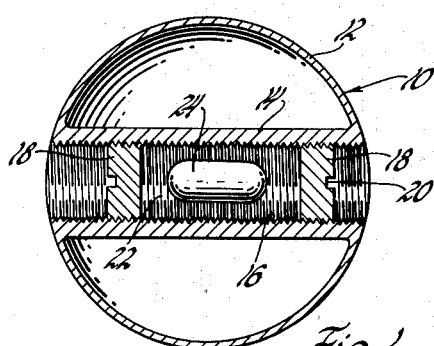
Fig.1
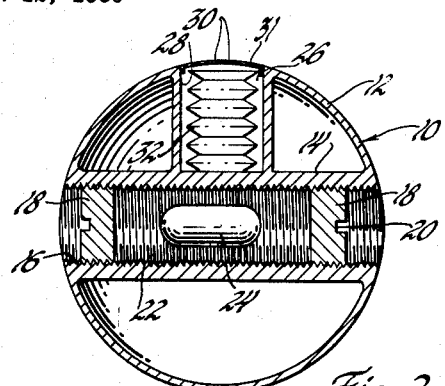
Fig.2
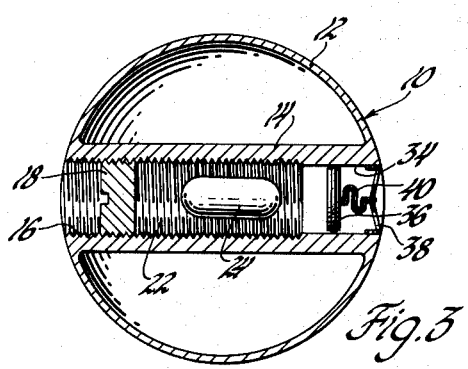
Fig.3
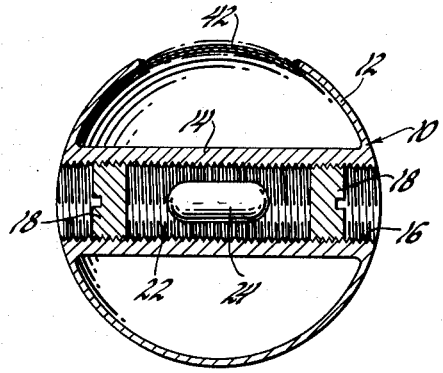
Fig.4
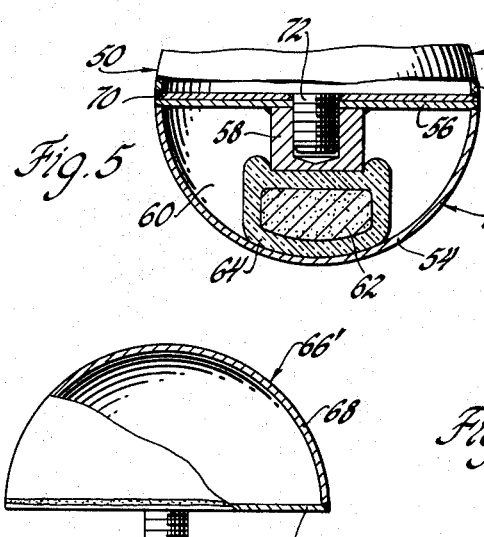
Fig.5
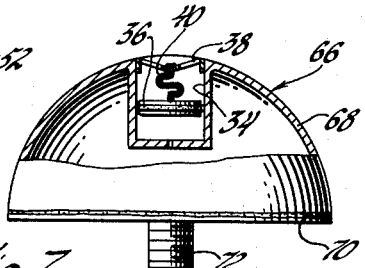
Fig.7
Fig.6
INVENTOR.
John P. Danforth, &
BY  Walter Kerwick
Paul J. Ethington
ATTORNEY

3,231,739
VARIABLE SPECIFIC GRAVITY RADIOACTIVE SOURCE HOLDER

John P. Danforth, Mount Clemens, and Walter Kerwick, Dearborn, Mich., assignors to General Motors Corporation, Detroit, Mich., a corporation of Delaware
Filed Oct. 12, 1960, Ser. No. 62,259
2 Claims. (Cl. 250—106)

This invention relates to a variable specific gravity container and more particularly to a radioactive source container for immersion in a fluid which has its specific gravity adjustable to the same specific gravity as the fluid.

The method of detecting leaks in a conduit carrying a fluid, as described in the copending application of J. P. Danforth and R. E. Black, S.N. 720,079, filed March 10, 1958, now Patent No. 3,093,739, and assigned to the assignee of the present invention, consists of plugging the end of the conduit, placing a ball or other receptacle containing a radioactive material in the conduit upstream of the leak, letting the fluid flow carry the ball to the side of the leak, and tracing the course of the ball by a radiation detector. The ball will stop at the leak since there will be no fluid flow beyond the leak point. In the practice of this method, it has been found that the specific gravity of the ball is of major importance in causing the ball to coincide with the flow streamlines. It has been determined that the specific gravity of the ball should be the same as that of the fluid. One of the problems encountered in constructing a suitable container for practical use is that each different type of fluid to be tested will likely have a different specific gravity. Further, even if one were concerned only with a single fluid, such as water, the specific gravity of the fluid will vary according to its temperature.

It is an object of this invention to overcome these difficulties by providing a radioactive source container which has an adjustable specific gravity so that it may be used with a variety of fluids.

Another object of the invention is to provide a means to automatically adjust the specific gravity of the container to compensate for changes in density of the fluid as well as changes of density of the container itself when it is subjected to temperature changes.

The invention is carried out in one modification by providing a container with an aperture having a plug therein so that the effective volume of the container and hence its specific gravity may be varied by adjusting the plug within the aperture.

Another embodiment of the invention is carried out by providing a container with a ballast portion which may be removed and replaced by another ballast portion of a different specific gravity thereby varying the specific gravity of the entire assembly.

The invention further provides for the changing of the volume of the container by the displacement of a temperature responsive element to compensate for specific gravity changes due to temperature changes.

The above and other advantages of the invention will be made more apparent from the following specification taken in conjunction with the accompanying drawings wherein like numerals refer to like parts and wherein:

FIGURE 1 is a cross section view of a radioactive source container constructed according to the present invention;

FIGURES 2, 3 and 4 are cross section views of modifications of the structure of FIGURE 1 which accommodate various temperature responsive elements;

FIGURE 5 is a partly broken away view of a radioactive source container constructed in accordance with another embodiment of the invention; and FIGURES 6 and 7 are partly broken away views of the ballast portion of the radioactive source container of FIGURE 5.

Referring now to the drawings, FIGURE 1 shows a radioactive source container 10 comprising a sphere constructed of a thin metal shell 12. An integral cylindrical portion 14 extends diametrically across the interior of the sphere 10 and has a tapped hole 16 extending entirely through the center thereof. The hole 16 extends through the shell 12 at both ends of the cylindrical portion 14. A threaded plug 18 having a slot 20 engageable by a screwdriver is screwed into each end of the hole 16 so as to define a chamber 22 near the center of the container 10, which chamber 22 comprises a side wall defined by a portion of the tapped hole 16 and end surfaces formed by the two plugs 18. This chamber 22 serves as a receptacle for the radioactive source which preferably is in the form of a capsule 24. Obviously, the capsule 24 may be readily inserted or withdrawn from the chamber 22 by removing one of the threaded plugs 18. The plugs have the further function of providing a means for varying the specific gravity of the container 10; that is, one or both plugs 18 may be screwed inwardly toward the center of the sphere to decrease the volume of the sphere or they may be screwed outwardly away from the center of the sphere to increase the volume. Thus the buoyancy of the container 10 in a fluid is decreased or increased.

It is readily apparent that by trial and error the person using the container 10 can easily adjust its volume so that the combined specific gravity of the radioactive capsule 24 and the container 10 will match that of the fluid in which it is to be used. Of course, the range of variation of specific gravity is limited to the amount of volume change which may be effected by movement of the plugs 18. This necessitates that the specific gravity of the container 10 for an intermediate position of the plugs 18 be close to the specific gravities of the fluids in which it is to be used. For use with water and similar liquids, a suitable specific gravity has been achieved by constructing the container 10 of stainless steel wherein the shell 12 is two inches in diameter, and 0.015 inch thick. The cylindrical portion 14 is 11/16 inch in diameter and has a one-half inch tapped hole 16 therein. The plugs 18 are one-quarter inch thick and are fitted sufficiently tight within the tapped hole 16 to provide a liquid seal.

It sometimes happens that a fluid, during its course through a conduit, undergoes a change in temperature. This is likely to occur for example when the conduit is laid beside steam pipes. The consequent heating and expansion of the fluid results in lowering the specific gravity thereof. A container 10 within the conduit would similarly undergo a change of specific gravity. However, since the coefficient of thermal expansion of water or petroleum, for instance, is several times greater than the coefficient of the steel container exemplified above, the fluid would tend to become less dense than the container. According to one aspect of the invention, it is proposed to incorporate into the container, a temperature responsive element which automatically changes the volume of the container to compensate for the different rates of expansion of the fluid and container. Specific examples of how to accomplish this invention are illustrated in FIGURES 2, 3 and 4.

FIGURE 2 shows a device similar to that of FIGURE 1 but has in addition a means for changing the volume of the container 10 according to temperature variations. More particularly, a cylindrical cavity 26 is formed in the container 10 perpendicular to the tapped cylindrical portion 14 and is defined by a cylindrical wall 28 which reaches from the shell 12 of the container to the cylindrical portion 14. The portion of the shell 12 at the mouth of the cavity 26 is replaced by a cap 31 having apertures 30 therein to assure communication of the ambient fluid with the interior of the cavity 26. A bellows 32 within the cylinder 26 is filled with a suitable fluid, such as acetone or other subsance, which will give the thermal expansion characteristics found to be most suitable for the particular application.

The modification of FIGURE 3 is also similar to FIGURE 1 except that the cylindrical portion 14 is tapped part way through from one end while the other end has a smooth cylindrical bore 34 formed therein. A piston 36 is slidably fitted with the bore 34. A support member 38 extends across the outer opening of the bore 34 and has attached thereto one end of a bimetallic spring 40—the other end of the spring 40 being connected to the piston 36. Accordingly, as the temperature of the ambient fluid changes, the length of the bimetal spring 40 will also change thereby moving the piston 36 to vary the effective volume of the container 10.

The embodiment of FIGURE 4 is a similar to that of FIGURE 1 except a portion of the shell 12 has been cut away and a bimetallic curved disk 42 is inserted in the resulting opening to thereby form a part of the container surface. It is readily seen that this bimetal disk 42 will change in shape as indicated by broken lines as the temperature of the disk changes thereby resulting in a change of volume of the container.

FIGURE 5 illustrates a radioactive source container 50 which comprises a hemispherical receptacle portion 52 defined by a hemispherical metal shell 54 enclosed by a planar sheet of metal 56. A female screw threaded adapter 58 is secured to the center of the sheet metal 56. The cavity 60 defined within the shell 54 forms a receptacle for a radioactive source 62. The radioactive source 62 is encapsulated within a quartz ampule 64 and the ampule is wedged between the adapter 58 and the shell 54. Since no means is provided to readily insert the source 62 into the receptacle 52 after fabrication thereof, it is preferable to reduce radiation hazard by using non-radioactive material 62 for fabrication of the receptacle 52 and later render the material radioactive by irradiation. Ballast portion 66 similarly comprises a hemispherical shell 68 secured to a planar sheet of metal 70 and has a male screw member 72 attached at the center thereof and adapted to engage the female screw adapter 58 of the first portion so that the container has a spherical configuration. To change the specific gravity of the assembly, it is necessary merely to remove the ballast portion 66 and replace it by another ballast portion 66' of different specific gravity. Then if a source container 50 were desired to be adapted to different media, such as water, kerosene, alcohol, fuel oil, etc., a different ballast portion 66 would be used for each medium. For every case, the same receptacle portion 52 would be used. This arrangement has the advantage that the container 50 may be easily prepared for use with a certain fluid without the trial and error adujstment and the excessive handling of radioactive materials. It is noted that the invention as depicted in FIGURE 5 is suggestive of many forms which embody the same principle. For example, a ballast portion could be inserted into the interior of a receptacle rather than secured to the exterior as illustrated.

The container 50 may include one of the temperature responsive devices shown in FIGURES 2, 3 or 4. In FIGURE 7 the piston and bimetallic spring arrangement is illustrated installed in the ballast portion 66 as an example. This has the advantage that since a different ballast portion is used for each fluid, the temperature responsive element 40 may be built to have the expansion characteristics exactly suitable for that specific fluid. Of course, the temperature responsive element may be in the receptacle portion 52 in which case some compromise would need to be made in the expansion characteristics of element 40 so as to be approximately suitable for use in several fluids.

The effect of maintaining the specific gravity of the container 10 substantially equal to that of the fluid in which it is immersed is to allow the container to follow the course of the fluid through a conduit without having its progress impeded by dragging on the top or bottom thereof.

To further insure that the container 10 is carried along by the fluid it is helpful to provide a fin-like protuberence on the container 10 to slightly increase the resistance of the container to relative motion with respect to the fluid. A wire (not shown) circumscribing the container in a hexagonal configuration and secured to the container has been found to be satisfactory for this purpose.

It will thus be seen that the proposed invention provides means for varying the specific gravity of a container to match the specific gravity of the fluid in which the container is to be used and in addition, to provide an automatically compensating portion which will correct the specific gravity of the ball when necessary due to temperature variations in the ambient fluid.

While the invention has been described with reference to particular embodiments thereof it is understood that other embodiments are possible within the scope of the invention as defined in the following claims.

What is claimed is:

1. A radioactive source assembly for immersion in a fluid including a ball having a cavity therein, a radioactive source within said cavity, an access port in communication with said cavity, a closure member in said access port and temperature responsive means associated with said ball for compensating for the relative change in density of said assembly and said fluid due to temperature changes, said temperature responsive means comprising a cylindrical opening within said ball, a piston member cooperating with said opening, and a bimetallic spring connected to said piston and adapted to move said piston in response to said temperature changes.

2. A radioactive source assembly for immersion in a fluid including a ball having a cavity therein, a radioactive source within said cavity, an access port in communication with said cavity, a closure member in said access port and temperature responsive means associated with said ball for compensating for the relative change in density of said assembly and said fluid due to temperature changes, said temperature responsive means comprising a fluid filled bellows within said ball, and means for permitting circulation of the first said fluid around said bellows so that the volume of said bellows and hence of the assembly will vary according to ambient temperature changes.

References Cited by the Examiner

UNITED STATES PATENTS

| | | | |
|---|---|---|---|
| 1,362,305 | 12/1920 | Hawxhurst | 73—449 |
| 1,935,564 | 11/1933 | Cristie | 73—449 |
| 2,078,977 | 5/1937 | Samiran | 73—448 |
| 2,456,233 | 12/1948 | Wolf | 250—43.5 |
| 2,972,050 | 2/1961 | Allen | 250—43.5 |
| 3,032,653 | 5/1962 | White | 250—43.5 |

RALPH G. NILSON, *Primary Examiner.*